US010100205B2

(12) United States Patent
Yoshino et al.

(10) Patent No.: US 10,100,205 B2
(45) Date of Patent: Oct. 16, 2018

(54) POWDER COATING MATERIAL

(71) Applicant: FUJI XEROX CO., LTD., Tokyo (JP)

(72) Inventors: Susumu Yoshino, Kanagawa (JP);
Masato Mikami, Kanagawa (JP);
Hideo Maehata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 131 days.

(21) Appl. No.: 14/795,462

(22) Filed: Jul. 9, 2015

(65) Prior Publication Data

US 2016/0230021 A1    Aug. 11, 2016

(30) Foreign Application Priority Data

Feb. 9, 2015  (JP) .................................. 2015-023121

(51) Int. Cl.

| | | |
|---|---|---|
| *C09D 5/03* | (2006.01) | |
| *C09D 167/02* | (2006.01) | |
| *C09D 7/12* | (2006.01) | |
| *C09D 7/62* | (2018.01) | |

(52) U.S. Cl.
CPC ............. *C09D 5/031* (2013.01); *C09D 5/035* (2013.01); *C09D 7/62* (2018.01); *C09D 167/02* (2013.01)

(58) Field of Classification Search
CPC .................... C09D 5/03–5/038; C09D 167/02
See application file for complete search history.

(56) References Cited

U.S. PATENT DOCUMENTS

| | | | | |
|---|---|---|---|---|
| 3,868,338 A | * | 2/1975 | Parsons, III | ......... C09D 101/14 523/447 |
| 2009/0253827 A1 | * | 10/2009 | Mukai | ...................... C08J 3/126 523/201 |
| 2010/0282612 A1 | * | 11/2010 | Tanaka | ................... B82Y 30/00 205/50 |
| 2012/0064238 A1 | * | 3/2012 | DeSaw | ............... C09B 67/0033 427/201 |

FOREIGN PATENT DOCUMENTS

| | | |
|---|---|---|
| CN | 1139136 A | 1/1997 |
| CN | 101155859 A | 4/2008 |
| CN | 102089392 A | 6/2011 |
| JP | 2003-119427 A | 4/2003 |
| JP | 2007-084709 A | 4/2007 |
| JP | 2007-270043 A | 10/2007 |
| JP | 2012-092206 A | 5/2012 |

OTHER PUBLICATIONS

Flick, Plastics Additives, vol. 1: An Industry Guide, p. 138. 2001.*
Mar. 2, 2018 Office Action issued in Chinese Application No. 201510570463.6.
Jul. 10, 2017 Office Action issued in Chinese Patent Application No. 201510570463.6.

* cited by examiner

*Primary Examiner* — Alexandre F Ferre
(74) *Attorney, Agent, or Firm* — Oliff PLC

(57) ABSTRACT

A powder coating material includes powder particles that include a binder resin, have an average circularity of 0.97 or greater, and have a coloring pigment provided on a surface of the powder particles.

14 Claims, No Drawings

POWDER COATING MATERIAL

CROSS-REFERENCE TO RELATED APPLICATIONS

This application is based on and claims priority under 35 USC 119 from Japanese Patent Application No. 2015-023121 filed Feb. 9, 2015.

BACKGROUND

1. Technical Field

The invention relates to a powder coating material.

2. Related Art

Recently, a technique of powder coating using powder coating materials has received attention in view of global environmental protection because the amount of discharged volatile organic compounds (VOC) in a coating step is small, and powder coating materials which are not attached to an object to be coated may be collected and reused after the coating. Therefore, with respect to the powder coating materials, various kinds of powder coating materials are researched.

SUMMARY

According to an aspect of the invention, there is provided a powder coating material including powder particles that include a binder resin, have an average circularity of 0.97 or greater, and have a coloring pigment provided on a surface of the powder particles.

DETAILED DESCRIPTION

Hereinafter, exemplary embodiments of the powder coating material of the present invention will be described in detail.

Powder Coating Material

The powder coating material of the embodiment includes powder particles of which the average circularity is 0.97 or greater, and a coloring pigment is provided on a surface of the powder particles.

According to the powder coating material of the embodiment, the formation of the color unevenness is prevented. The reasons thereof are not clear, but it is assumed as follows.

In the related art, the powder coating material used when coating powder is manufactured by mixing and melting other components such as a binder resin, a curing agent that is used if necessary and cures the binder resin, the pigment for coloring, a flame retardant, or a leveling agent and pulverizing the resultant to have a desired particle diameter. The powder coating material manufactured in this manner coats an object to be coated by a method such as a fluidized dipping method or an electrostatic coating method. The fluidized dipping method is the method of dipping an object to be coated which is heated to a hot temperature in advance into powder, and causing the powder to be melted and attached. Meanwhile, the electrostatic coating method is a method of causing the powder to be electrostatically attached by providing the electric field between the object to be coated and a spray gun and discharging the powder charged by contact charging or corona discharging.

However, in many cases, the powder coating material in the related art is large powder of which the volume particle diameter is 20 μm or greater. Therefore, even if it is desired to obtain an intermediate color by mixing (toning) various colors of powder, a mottled appearance of respective colors remains on the coated film so that uneven colors may appear. Therefore, in the powder coating material, it is required to manufacture significantly various colors of powder coating materials.

If the powder coating material is manufactured by manufacturing steps including the pulverizing step described above, in the manufacturing of all kinds of colors of powder coating materials, resins, curing agents, coloring agents, and other materials are mixed, melted, and pulverized. Therefore, the manufacturing scale of the powder coating material of the respective colors is great, much manufacturing time is required, and thus the technique in the related art is not efficient.

Therefore, after the powder particles that become base portions of the powder coating material are manufactured, the coloring pigment is provided on the surface of the powder particles, and the powder coating material is manufactured. Therefore, the manufacturing scale when the various colors of powder coating materials are manufactured may be made small so that the manufacturing efficiency is improved. However, if the powder particles that become base portions are not spherical, surface of the powder particles may be uneven, and thus it may be difficult for a coloring pigment to be accurately provided on the surface of the powder particles. When the coloring pigment is provided in a state in which unevenness remains on the surface of the powder particles, electrostatic properties of the powder coating materials may be uneven, and, as a result, the formation of the color unevenness may occur.

According to the embodiment, the unevenness on the surface of the powder particles is reduced by causing the average circularity of the powder particles which become the base portions of the powder coating materials to be 0.97 or greater, and thus the coloring pigments may be more accurately provided on the surface of the powder particles. As a result, it is assumed that the unevenness of the electrostatic properties of the powder coating materials is prevented, and thus the formation of the color unevenness is prevented.

Hereinafter, the details of the powder coating materials according to the embodiment are described.

The powder coating material of the embodiment contains powder particles. In the powder coating material, in order to enhance fluidity, inorganic oxide particles may be used as an external additive, if necessary.

Powder Particles

The structure of powder particles contained in the powder coating material according to the embodiment is not particularly limited. In order to prevent the white pigments described below which may be contained in the powder particles from being exposed on the surface of the powder particles, the powder particle may have a structure including a core and a resin coated portion that coats the surface of the core. That is, the powder particle may be a particle having a core-shell structure.

Characteristics of Powder Particles

The average circularity of the powder particles according to the embodiment is considered to be 0.97 or greater. If the average circularity of the powder particles is less than 0.97, it is not preferable because the surface of the powder particles is uneven and thus coloring pigments are hardly attached to convex portions and are easily attached to concave portions, and, as a result, unevenness occurs in the attachment. In addition, the average circularity of less than 0.97 is not preferable because the fluidity of the powder particles is deteriorated due to the unevenness, and attachment unevenness occurs accordingly.

The average circularity of the powder particles is preferably 0.98 or greater, and more preferably 0.99 or greater.

The average circularity of the powder particles is measured by using a flow-type particle image analyzer "FPIA-3000" (manufactured by Sysmex Corporation). Specifically, a surfactant (alkylbenzene sulfonic acid salt) in the range of 0.1 ml to 0.5 ml as a dispersant is added to water in the range of 100 ml to 150 ml from which solid impurities are removed in advance, and a measurement sample in the range of 0.1 g to 0.5 g is further added. The suspension in which the measurement sample is dispersed is dispersed for 1 minute to 3 minutes by a supersonic disperser and the concentration of the dispersion is caused to be in the range of 3,000 particles/µl to 10,000 particles/µl. With respect to the dispersion, the average circularity of the powder particles is measured by using the flow-type particle image analyzer.

Here, the average circularity of the powder particles is a value obtained by obtaining respective values of circularity (Ci) of n particles which are measured with respect to the powder particles and, subsequently, calculated by the following expression. However, in the following expression, Ci represents circularity (=circumference length of circle having the same projected area of particle/circumference length of particle projection image), and fi represents a frequency of powder particles.

$$\text{Average circularity } (Ca) = \left( \sum_{i=1}^{n} (Ci \times fi) \right) \bigg/ \sum_{i=1}^{n} (fi)$$

In view of smoothness of the coated film, and storing properties of the powder coating material, a volume average particle size distribution index GSDv of the powder particles according to the embodiment is preferably 1.40 or lower, and more preferably 1.30 or lower. If the volume average particle size distribution index GSDv is 1.40 or lower, the deterioration of the smoothness of the coated film is prevented.

A volume average particle diameter D50v of the powder particles according to the embodiment is preferably in the range of 3 µm to 30 µm, and more preferably in the range of 3 µm to 8 µm. If the volume average particle diameter D50v of the powder particles is 3 µm or greater, the powder fluidity is improved and air conveyance properties from a powder container are improved. Meanwhile, if the volume average particle diameter D50v of the powder particles is 30 µm or lower, the deterioration of the smoothness of the coated film is prevented.

Here, the volume average particle diameter D50v of the powder particles and the volume average particle size distribution index GSDv are measured with a Coulter Multisizer II (manufactured by Beckman Coulter, Inc.) by using ISOTON-II (manufactured by Beckman Coulter, Inc.) as the electrolyte.

When the measurement is performed, the measurement sample in the range of 0.5 mg to 50 mg is added to 2 ml of 5% aqueous solution of a surfactant (sodium alkylbenzene sulfonate is preferable) as a dispersant. This is added to the electrolyte in the range of 100 ml to 150 ml.

The electrolyte in which the sample is suspended is dispersed by a supersonic disperser for one minute, and particle size distribution of particles having particle diameters in the range of 2 µm to 60 µm is measured with the Coulter Multisizer II by using apertures of 100 µm in an aperture diameter. In addition, the number of particles subjected to sampling is 50,000.

Cumulative distribution is drawn with volumes from small diameters with respect to the particle size range (channel) partitioned based on the measured particle size distribution, a particle diameter which becomes a cumulative 16% is defined as a volume particle diameter D16v, a particle diameter which becomes a cumulative 50% is defined as a volume average particle diameter D50v, and a particle diameter which becomes a cumulative 84% is defined as a volume particle diameter D84v.

Also, a volume average particle size distribution index (GSDv) is calculated as $(D84v/D16v)^{1/2}$.

Binder Resin

The powder particles according to the embodiment may contain a binder resin.

As the binder resin, various kinds of resins may be used. Among them, an acrylic resin and a polyester resin are preferable, and a polyester resin is more preferable. Further, according to the embodiment, a (meth)acrylic acid means an acrylic acid or a methacrylic acid, (meth)acrylate means acrylate or methacrylate, (meth)allyl means allyl or methallyl, (meth)acrylamide means acrylamide or methacrylamide, and (meth)acryloyl means acryloyl or methacryloyl.

Acrylic Resin

An acrylic resin may have a curing reactive group.

As the curing reactive group in the acrylic resin, an epoxy group, a carboxyl group, a hydroxyl group, an amide group, an amino group, an acid anhydride group, a (blocked) isocyanate group, or the like may be used. Among them, at least one selected from the group consisting of an epoxy group, a carboxyl group, and a hydroxyl group is preferable, because they may be easily prepared. Among them, at least one of the curing reactive groups is more preferably an epoxy group, since the epoxy group is excellent in storage stability and appearance of a coated film. In order to introduce the curing reactive group, a vinyl monomer having a curing reactive group may be used.

Vinyl monomers having the curing reactive group are exemplified. First, if the curing reactive group is an epoxy group, for example, various kinds of epoxy group-containing monomers such as glycidyl (meth)acrylate, β-methyl glycidyl (meth)acrylate, glycidyl vinyl ether, and allyl glycidyl ether; (2-oxo-1,3-oxolane) group-containing vinyl monomers such as (2-oxo-1,3-oxolane) methyl (meth)acrylate, and various kinds of alicyclic epoxy group-containing vinyl monomers such as 3,4-epoxycyclohexyl (meth)acrylate, 3,4-epoxycyclohexylmethyl (meth)acrylate, and 3,4-epoxycyclohexylethyl (meth)acrylate may be used.

In addition, when the curing reactive group is a carboxyl group, for example, various kinds of carboxyl group-containing monomers such as a (meth)acrylic acid, a croton acid, an itaconic acid, a maleic acid, and a fumaric acid; various kinds of monoesters of α,β-unsaturated dicarboxylic acids with monohydric alcohol having 1 to 18 carbon atoms such as monomethyl fumarate, monoethyl fumarate, monobutyl fumarate, monoisobutyl fumarate, mono tert-butyl fumarate, monohexyl fumarate, monooctyl fumarate, mono 2-ethylhexyl fumarate, monomethyl maleate, monoethyl maleate, monobutyl maleate, monoisobutyl maleate, mono tert-butyl maleate, monohexyl maleate, monooctyl maleate, and mono 2-ethylhexyl maleate; monoalkyl ester of itaconic acid such as monomethyl itaconate, monoethyl itaconate, monobutyl itaconate, monoisobutyl itaconate, monohexyl itaconate, monooctyl itaconate, and mono 2-ethylhexyl itaconate may be used.

In addition, if the curing reactive group is a hydroxyl group, for example, various kinds of hydroxyl group-containing (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate; addition reaction products of various kinds of (meth)acrylates described above and ε-caprolactone; various kinds of hydroxyl group-containing vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether; additional reaction products of various kinds of vinyl ethers described above and ε-caprolactone; various kinds of hydroxyl group-containing allyl ethers such as 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth) allyl ether, 2-hydroxy-2-methylpropyl (meth)allyl ether, 5-hydroxypentyl (meth)allyl ether, and 6-hydroxyhexyl (meth)allyl ether; and an additional reaction product of various kinds of allyl ethers described above and ε-caprolactone may be used.

Further, if necessary, other copolymerizable vinyl monomers may be also used. For example, alkyl (meth)acrylate such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth)acrylate, lauryl (meth)acrylate, or stearyl (meth)acrylate; various kinds of alkyl carbitol (meth)acrylates such as benzyl (meth)acrylate, phenyl (meth)acrylate, phenoxyethyl (meth)acrylate or tetrahydrofurfuryl (meth)acrylate, or ethylcarbitol (meth)acrylate, various kinds of (meth)acrylic acid esters such as isobornyl (meth)acrylate, dicyclopentanyl (meth)acrylate, dicyclopentenyl (meth)acrylate or dicyclopentenyloxy ethyl (meth)acrylate; various kinds of α-olefins such as ethylene, propylene, butene-1; various kinds of halogenated olefins (halo.olefins) except for fluoroolefin such as vinyl chloride and vinylidene chloride; various kinds of aromatic vinylmonomers such as styrene, α-methylstyrene, and vinyltoluene; diesters of various kinds of unsaturated dicarboxylic acids and monohydric alcohol having 1 to 18 carbon atoms such as dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate; various kinds of amino group-containing amide-based unsaturated monomers such as N-dimethylaminoethyl (meth)acrylamide, N-diethylaminoethyl (meth)acrylamide, N-dimethylaminopropyl (meth) acrylamide, and N-diethylaminopropyl (meth)acrylamide; various kinds of dialkylaminoalkyl (meth)acrylates such as dimethylaminoethyl (meth)acrylate and diethylaminoethyl (meth)acrylate; various kinds of amino group-containing monomers such as tert-butylaminoethyl (meth)acrylate, tert-butylaminopropyl (meth)acrylate, aziridinylethyl (meth) acrylate, pyrrolidinylethyl (meth)acrylate, and piperidinylethyl (meth)acrylate; various kinds of acid anhydride group-containing monomers such as maleic anhydride, itaconic anhydride, citraconic anhydride, (meth)acrylic anhydride, and tetrahydrophthalic anhydride; various kinds of phosphoric acid ester group-containing monomers such as diethyl-2-(meth)acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate; various kinds of hydrolyzable silyl group-containing monomers such as γ-(meth)acryloyloxy propyltrimethoxysilane, γ-(meth)acryloyloxy propyltriethoxysilane, and γ-(meth)acryloyloxy propylmethyldimethoxysilane; various kinds of aliphatic vinyl carboxylates such as vinyl acetate, vinyl propionate, vinyl butyrate, vinyl isobutyrate, vinyl caproate, vinyl caprylate, vinyl caprate, vinyl laurate, branched aliphatic vinyl carboxylate having 9 carbon atoms, branched aliphatic vinyl carboxylate having 10 carbon atoms, branched aliphatic vinyl carboxylate having 11 carbon atoms, and vinyl stearate; and various kinds of vinylesters of carboxylic acid having a cyclic structure such as vinyl cyclohexane carboxylate, vinyl methyl cyclohexane carboxylate, vinyl benzoate, and vinyl p-tert-butyl benzoate are exemplified.

As the acrylic resin, the acrylic resin having a number average molecular weight in the range of 1,000 to 20,000 is preferable, and an acrylic resin having a number average molecular weight in the range of 1,500 to 15,000 is more preferable.

If the number average molecular weight is within the range described above, the smoothness of the coated film and the mechanical physical properties may be easily improved.

A number average molecular weight of the binder resin is measured by gel permeation chromatography (GPC). The measurement of the molecular weight by GPC is performed with a THF solvent by using HLC-8120GPC which is a GPC manufactured by Tosoh Corporation, as a measurement apparatus, and using TSK gel Super HM-M (15 cm) which is a column-manufactured by Tosoh Corporation. The weight average molecular weight and the number average molecular weight are calculated by using a molecular weight calibration curve created by a monodisperse polystyrene standard sample from the measurement result.

When the acrylic resin is used as a binder resin, monomers are emulsified in water, a water soluble initiator, and a chain transfer agent for controlling a molecular weight, if necessary, are added into the mixture and heated, emulsion polymerization is performed, and thus the binder resin particle dispersion may be obtained.

Polyester Resin

Polyol, a polybasic acid, and various kinds of well-known and common compounds that may be used as a raw material of the polyester resin may be used, and a polyester resin having a carboxy and/or hydroxyl group may be obtained by adjusting the usage amount of these polyol and polybasic acid.

First, examples of particularly representative polyols are ethylene glycol, diethylene glycol, propylene glycol, dipropylene glycol, 1,3-buthanediol, 1,4-buthanediol, 1,5-pentanediol, 1,6-hexanediol, neopentyl glycol, triethylene glycol, bis-hydroxyethyl terephthalate, cyclohexane dimethanol, octanediol, diethyl propanediol, butyl ethyl propanediol, 2-methyl-1,3-propanediol, 2,2,4-trimethyl pentanediol, hydrogenated bisphenol A, an ethylene oxide adduct of hydrogenated bisphenol A, a propylene oxide adduct of hydrogenated bisphenol A, trimethylolethane, trimethylolpropane, glycerine, pentaerythritol, tris hydroxyethyl isocyanurate, and hydroxy pivalyl hydroxy pivalate.

Examples of representative polybasic acids described above include terephthalic acid, isophthalic acid, phthalic acid, methylterephthalic acid, trimellitic acid, pyromellitic acid, or anhydride thereof; succinic acid, adipic acid, azelaic acid, sebacic acid, or anhydride thereof; maleic acid, itaconic acid, or anhydride thereof; fumaric acid, tetrahydrophthalic acid, methyltetrahydrophthalic acid, hexahydrophthalic acid, methylhexahydrophthalic acid, or anhydride thereof; cyclohexanedicarboxylic acid, and 2,6-naphthalenedicarboxylic acid.

Further, as a raw material of the polyester resin, a compound having a carboxyl group and a hydroxyl group in a molecule in combination such as dimethanolpropionic acid and hydroxypivalate; a monoepoxy compound such as "Cardura E10" (product name of glycidyl ester of branched aliphatic carboxylic acid manufactured by Royal Dutch Shell plc, The Netherlands); various kinds of monohydric alcohols such as methanol, propanol, butanol, and benzylalcohol; various kinds of univalent basic acids such as benzoic acid and p-tert-butyl benzoate; and various kinds of fatty acids such as caster oil fatty acid, coconut oil fatty acid, and soybean oil fatty acid may be used.

As the polyester resins that may be obtained by using the various kinds of polyols, the polybasic acids, and other raw materials as described above, a polyester resin in which the sum of the acid value and the hydroxyl value is in the range of 10 mgKOH/g to 250 mgKOH/g, and the number average molecular weight is in the range of 1,000 to 100,000 is preferable.

If the sum of the acid value and the hydroxyl value is in the above range, a coated film of which the smoothness and the mechanical properties are excellent may be obtained. Further, if the number average molecular weight is in the above range, a coated film of which the smoothness and the mechanical properties are excellent and also the storage stability is excellent may be obtained.

The structure of the polyester resin is not particularly limited as long as characteristic values of the resin are in the range described above, and may be a branched structure or a linear structure.

If a polyester resin is used as a binder resin, monomers are heated and melted, are polycondensed under reduced pressure, are dissolved by adding a solvent such as ethyl acetate, are stirred while further adding a weak alkaline aqueous solution, and are subjected to phase-inversion emulsification, so that the binder resin particle dispersion may be obtained.

The content of the binder resin is preferably in the range of 20% by weight to 99% by weight, and more preferably in the range of 30% by weight to 95% by weight with respect to the entire powder particle.

Curing Agent

The powder particle according to the embodiment may contain a curing agent for curing the binder resin. The curing agent is selected according to the kind of the curing reactive group of the binder resin.

If the curing reactive group included in the acrylic resin is an epoxy group, as the curing agent, succinic acid, glutaric acid, adipic acid, pimelic acid, suberic acid, azelaic acid, sebacic acid, dodecanedioic acid, eicosanedioic acid, maleic acid, citraconic acid, itaconic acid, glutaconic acid, phthalic acid, trimellitic acid, pyromellitic acid, tetrahydrophthalic acid, hexahydrophthalic acid, cyclohexene-1,2-dicarboxylic acid, an acid anhydride or an urethane-modified material thereof may be used. Among them, since physical properties of a coated film and storage stability of aliphatic dibasic acid are excellent, the aliphatic dibasic acid is preferable, and since physical properties of a coated film of dodecanedioic acid are particularly excellent, dodecanedioic acid is particularly preferable.

In addition, if the curing reactive group included in the acrylic resin is a carboxyl group, as the curing agent, various kinds of epoxy resins such as polyglycidyl ether of bisphenol A; an epoxy group-containing acrylic resin such as a glycidyl group-containing acrylic resin; various kinds of polyglycidyl ethers of polyol such as 1,6-hexanediol, trimethylolpropane, and trimethylolethane; various kinds of polyglycidyl esters of polyvalent carboxylic acid such as phthalic acid, terephthalic acid, isophthalic acid, hexahydrophthalic acid, methylhexahydrophthalic acid, trimellitic acid, and pyromellitic acid; various kinds of alicyclic epoxy group-containing compounds such as bis(3,4-epoxycyclohexyl)methyladipate; and triglycidyl isocyanurate and hydroxyamides such as β-hydroxyalkylamide may be used.

In addition, when the curing reactive group included in the acrylic resin is a hydroxyl group, as the curing agent, polyblocked isocyanate, aminoplast, or the like is preferable.

As the polyblocked polyisocyanate, organic diisocyanate such as various kinds of aliphatic diisocyanates such as hexamethylene diisocyanate and trimethyl hexamethylene diisocyanate; various kinds of cyclic aliphatic diisocyanates such as xylylene diisocyanate and isophorone diisocyanate; and various kinds of aromatic diisocyanates such as tolylene diisocyanate, 4,4'-diphenylmethane diisocyanate, adducts of the organic diisocyanate with polyol, low molecular weight polyester resin (polyester polyol) or water, a polymer between the organic diisocyanates (isocyanurate-type polyisocyanate compound is also included), a product obtained by blocking various kinds of polyisocyanate compounds such as an isocyanate.biuret product with a well-known and common blocking agent, and a so-called self-blocked polyisocyanate compound having an uretdione bonding as a structural unit, or the like may be used. The curing agent used in the embodiment may be used singly, or two or more types thereof may be used in combination.

Since the polyester resin has a carboxyl group or a hydroxyl group in the molecule, as the curing agent of the polyester resin, a curing agent which is used when the curing reactive group included in the acrylic resin is a carboxyl group or a hydroxyl group may be used.

The content of the curing agent is preferably in the range of 1% by weight to 40% by weight, and more preferably in the range of 3% by weight to 25% by weight with respect to the binder resin.

White Pigment

The powder particles according to the embodiment may contain white pigments. If the white pigment is contained in the powder particle, the color of the surface of the object to be coated is concealed, and thus the coloring properties of the coloring pigment contained in the powder coating material of the embodiment is improved. The powder particle may contain a well-known colored pigment, but it is preferable that the powder particle does not contain a coloring pigment other than the white pigment so as not to have influence on the color of the coloring pigment provided on the surface.

As the white pigment contained in the powder particle, a well-known product may be used, and examples thereof include titanium oxide, barium sulphate, zinc oxide, and calcium carbonate.

The content ratio of the white pigment contained in the powder particle is preferably in the range of 10% by weight to 50% by weight, more preferably in the range of 15% by weight to 45% by weight, and still more preferably in the range of 20% by weight to 40% by weight.

Additive

As the additive, the powder particle according to the embodiment may use a surface conditioner such as silicones such as dimethyl silicone or methylsilicone, and acryl oligomer, a defoaming agent represented by benzoins such as benzoin or benzoin derivatives, a plasticizer, a charge-controlling agent, an antioxidant, a pigment dispersant, a flame retardant, a fluidity imparting agent, a curing promoter (or curing catalyst) such as an amine compound, an imidazole compound, and a cationic polymerization catalyst, or the like, in combination. The additive is preferably a product that may be prepared as emulsion or a dispersion product which is less than 1 µm.

The sum of the content ratios of the additives contained in the powder particle is preferably in the range of 0.1% by weight to 5% by weight, more preferably in the range of 0.3% by weight to 4% by weight, and still more preferably in the range of 0.5% by weight to 3% by weight.

Coloring Pigment

In the powder coating material according to the embodiment, a coloring pigment is provided on the surface of the powder particle.

Examples of the coloring pigment include iron oxide such as colcothar, an inorganic pigment such as titanium oxide, barium sulphate, zinc oxide, calcium carbonate, titan yellow, zinc white, white lead, zinc sulfide, litophone, antimony oxide, cobalt blue, and carbon black, and an organic pigment such as quinacridone red, phthalocyanine blue, phthalocyanine green, permanent red, Hansa yellow, indanthrene blue, brilliant fast scarlet, and benzimidazolone yellow, and these may be used singly, or two or more types thereof may be used in combination.

Further, as a brilliant pigment that gives brilliance to a coated film, it is effective to use a pearl pigment, metal powder or metal flakes such as aluminum powder, and stainless steel powder, glass beads, glass flake, mica, flake-shape iron oxide (MIO), and the like in combination.

The blending amount of the coloring pigment is not particularly limited, and is selected according to the kind of the coloring pigment to be used or a color, brightness, and a depth required in the coated film, but in the standard blending amount, the coloring pigment is selected in the range of about 1 part by weight to about 70 parts by weight with respect to 100 parts by weight of the binder resin. Further, dye may be blended in addition to the coloring pigment, if necessary.

Inorganic Oxide Particles

For the purpose of imparting fluidity or of the electrostatic properties, inorganic oxide particles such as silica, alumina, titania, and calcium carbonate may be provided on the surface of the powder particle according to the embodiment.

As the inorganic oxide particles used in the embodiment, $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, $MgSO_4$, or the like may be exemplified. Among them, silica particles are particularly preferable.

The volume average particle diameter of the inorganic oxide particles is preferably in the range of 5 nm to 200 nm, more preferably in the range of 7 nm to 100 nm, and still preferably in the range of 10 nm to 50 nm. If the inorganic oxide particles of which the volume average particle diameter is in the range of 5 nm to 200 nm are used, when coating is performed with the powder coating material by a spray gun or the like, powder particles are loosened by an air flow and easily fly off as primary particles, the powder particles are attached to a material to be coated in a state of the primary particles, the color arrangement (color tone) may be performed in the particle diameter unit, and thus toning properties become satisfactory.

In addition, the difference on the electrostatic properties between powder coating materials decreases by disposing the same kind of inorganic oxide particles on the surfaces of the plural powder coating materials having different colors from each other. Therefore, stable coating may be performed with the mixed (toned) powder coating materials, and thus the formation of the color unevenness is further prevented.

With respect to the inorganic oxide particles, the surfaces thereof are preferably subjected to a treatment with a hydrophobizing agent in advance. According to the hydrophobization treatment, powder fluidity of the powder particles is improved, and further it is more effective for the stability of the electrification.

The hydrophobization treatment may be performed by dipping the inorganic oxide particles into the hydrophobizing agent. The hydrophobizing agent is not particularly limited, and examples thereof include a silane coupling agent, silicone oil, a titanate-based coupling agent, and an aluminum-based coupling agent. These may be used singly, or two or more types thereof may be used in combination. Among these, the silane coupling agent is preferably included.

As the silane coupling agent, for example, any one of chlorosilane, alkoxysilane, silazane, and a special silylating agent may be used. Specifically, methyltrichlorosilane, dimethyldichlorosilane, trimethylchlorosilane, phenyltrichlorosilane, diphenyldichlorosilane, tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, isobutyltriethoxysilane, decyltrimethoxysilane, hexamethyldisilazane, N,O-(bistrimethylsilyl) acetoamide, N,N-(trimethylsilyl) urea, tert-butyldimethylchlorosilane, vinyltrichlorosilane, vinyltrimethoxysilane, vinyltriethoxysilane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, γ-mercaptopropyltrimethoxysilane, γ-chloropropyltrimethoxysilane, and the like are included.

The amount of the hydrophobizing agent used differs according to the kind of the inorganic oxide particles, and the amount may not regulated unconditionally, but commonly, the amount is in the range of about 1 part by weight to 50 parts by weight with respect to 100 parts by weight of the inorganic oxide particles.

The addition ratio of the inorganic oxide particles to the powder particles according to the embodiment is preferably in the range of 0.1% by weight to 3% by weight, and more preferably in the range of 0.3% by weight to 1.5% by weight. If the addition ratio of the inorganic oxide particles to the powder particles is 0.1% by weight or greater, the charge stability of the powder coating material is improved. Meanwhile, the addition ratio of the inorganic oxide particles to the powder particles is 3% by weight or lower, the melting of the powder particles is not inhibited by the inorganic oxide particles, and the strength of the coated film is improved.

Method of Preparing Powder Coating Material

A method of preparing the powder coating material according to the embodiment includes a powder particle preparing step of preparing powder particles of which the average circularity is 0.97 or greater, and a coloring pigment disposing step of disposing the coloring pigment on the surface of the powder particles.

If the coloring pigments are provided on the powder particles after preparing the powder particles of which the average circularity is 0.97 or greater in the powder particle preparing step, the manufacturing scale when the many colors of powder coating material are manufactured may be reduced, and thus the manufacturing efficiency is improved. In addition, the coloring pigment is more accurately provided on the surface of the powder particles by using the powder particle of which the average circularity is 0.97 or greater.

Powder Particle Preparing Step

The method of preparing the powder particles of which the average circularity is 0.97 or greater in the powder particle preparing step is not particularly limited, and the well-known method may be used.

For the preparation of the powder particles, a kneading and pulverizing method of kneading, pulverizing, and classifying, for example, a binder resin, and if necessary, a curing agent, a coloring agent, and an additive, and a dry method of changing the shape of the particles obtained by the kneading and pulverizing method by mechanical impact force or heat energies may be applied, but wet methods such as an emulsion polymerization aggregation method of performing emulsion polymerization on the polymerizable monomer of the binder resin, mixing the formed dispersion, and if necessary, dispersion of, for example, a curing agent, a coloring agent, and an additive, aggregating, heating, and adhering the resultant, and obtaining powder particles, a suspension polymerization method of suspending the polymerizable monomer for obtaining the binder resin, and if necessary, a solution of, for example, a curing agent, a coloring agent, and an additive, in an aqueous solvent, and polymerizing the resultant, and a solution and suspension method of suspending binder resin, and if necessary, a solution of, for example, a curing agent, a coloring agent, and an additive, in an aqueous solvent and granulating the resultant are preferably used. In addition, a preparing method may be performed by using the powder particles obtained in the method above as cores, further attaching, and coalescing the resin particles through heating, and causing the particles to have a core-shell structure.

Subsequently, a preparing method which is very appropriate when powder particles of the embodiment are prepared is more specifically described.

That is, as a method of preparing the powder particle according to the embodiment, for example, a method at least including an aggregating step of mixing a resin particle dispersion obtained by dispersing particles of the binder resin of which the particle diameter is at least 1 μm or lower, and if necessary, a curing agent dispersion obtained by dispersing the curing agent, a coloring agent dispersion obtained by dispersing a coloring agent and an additive dispersion, and forming aggregated particles and a coalescence step of heating the resin particles to a glass transition temperature or greater, and coalescing the resin particles is included.

First, in the aggregating step, a resin particle dispersion in which particles of the binder resin are dispersed, and if necessary, curing agent dispersion in which the curing agent is dispersed, a coloring agent dispersion, and additive dispersion are prepared. The resin particle dispersion is prepared by the emulsion polymerization or phase inversion emulsification by dissolving the resin in a dissolvable solvent. The coloring agent dispersion is prepared by using an ionic surfactant and an ionic surfactant with opposite polarity, and dispersing coloring agent particles of a desired color such as white color in a solvent.

In addition, the additive dispersion is prepared by dispersing additives in water together with an ionic surfactant and polymer electrolyte such as polymer acid, and polymer base, and performing granulating by an apparatus that may perform heating to a melting temperature or higher and apply strong shearing.

As an apparatus for performing dispersion by the mechanical method, Manton Gaulin high pressure homogenizer (Gaulin Co., Ltd.), a continuous supersonic homogenizer (Nippon Seiki Co., Ltd.), Nanomizer (NANOMIZER Inc.), Microfluidizer (Mizuho Industrial Co., Ltd.), Harrel homogenizer, Slasher (Nippon Coke & Engineering Co., Ltd.), and Cavitron (Eurotec. Co., Ltd.) may be included.

Subsequently, the resin particle dispersion, and if necessary, the curing agent dispersion, the coloring agent dispersion, and the additive dispersion are mixed and heteroaggregated, and aggregated particles (core aggregation particles) having diameters closed to the desired powder particle diameter are formed.

Here, the aggregated particles may be formed by preparing dispersion in which the resin, the curing agent, and the additive are respectively dispersed, or the aggregated particles may be formed by preparing dispersion in which the resin, the curing agent, and the additive are used at the same time. Further, after the core aggregation particles are formed, components different from the core aggregation particles, for example, only the resin particle dispersion, may be added, and the resin particles are further aggregated and attached on the surface of the core aggregation particles, so that the core-shell structure is formed.

Subsequently, in the coalescence step, the aggregation particles are heated to the glass transition temperature of the resin particle or higher (further, when there are two or more kinds of the resins, glass transition temperature of the resin having the highest glass transition temperature) in the solution, and coalesced to obtain powder.

At the end of the coalescence step, powder in the dry state is obtained from the powder formed in the solution by performing a well-known washing step, a solid-liquid separating step, and a drying step.

In addition, in the washing step, it is preferable to perform substitution washing with ion exchanged water in view of the charge properties. In addition, the solid-liquid separating step is not particularly limited, but in view of the productivity, suction filtration, pressure filtration, and the like are preferably used. Further, the drying step is not particularly limited, but in view of the productivity, freeze-drying, flash-jet drying, fluidizing drying, vibrating fluidizing drying, or the like is preferably used.

In order to prepare the particles of the binder resins, a well-known emulsification method may be used, but the phase inversion emulsification method in which the obtained particle size distribution is narrow, and which easily adjusts the volume average particle diameter to be in the range of 0.08 μm to 0.40 μm is effective.

In the phase inversion emulsification method, the resin is dissolved in an organic solvent that dissolves the resin, further singly in the amphipathic organic solvent or a mixed solvent, to be an oil phase. While the oil phase is stirred, the basic compound is dropped in a minute quantity, and water is dropped by driblets while the oil phase is further stirred, the water droplets are incorporated in the oil phase. Subsequently, if the amount of the dropped water exceeds a certain amount, the oil phase and the water phase are reversed so that the oil phase becomes oil droplets. Thereafter, the desolvation step under reduced pressure is performed, and thus the water dispersion is obtained.

Here, the amphipathic organic solvent refers to solvent of which the solubility to water at 20° C. is 5 g/L or greater, and preferably 10 g/L or greater. If the solubility is less than 5 g/L, the effect of accelerating the aqueous treatment speed is low, and the obtained water dispersion also has low storage stability. In addition, examples of the amphipathic organic solvent include alcohols such as ethanol, n-propanol, isopropanol, n-butanol, isobutanol, sec-butanol, tert-butanol, n-amylalcohol, isoamylalcohol, sec-amylalcohol, tert-amylalcohol, 1-ethyl-1-propanol, 2-methyl-1-butanol, n-hexanol, and cyclohexanol, ketones such as methyl ethyl ketone, methyl isobutyl ketone, ethyl butyl ketone, cyclohexanone, and isophorone, ethers such as tetrahydrofuran and dioxane, esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate, and dimethyl carbonate, glycol derivatives such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol monomethyl ether, diethylene glycol monoethyl ether, diethylene glycol monopropyl ether, diethylene glycol monobutyl ether, diethylene glycol ethyl ether acetate, propylene glycol, propylene glycol monomethyl ether, propylene glycol monopropyl ether, propylene glycol monobutyl ether, propylene glycol methyl ether acetate, and dipropylene glycol monobutyl ether, 3-methoxy-3-methylbutanol, 3-methoxybutanol, acetonitrile, dimethylformamide, dimethylacetoamide, diacetone alcohol, and ethyl acetoacetate. The solvent may be used singly, or two or more types thereof may be used in mixture.

The polyester resin according to the embodiment is neutralized by a basic compound when being dispersed in an aqueous medium. According to the embodiment, the neutralization reaction with the carboxyl group of the polyester resin is the driving force of the aqueous treatment, and aggregation between particles may be prevented by the electricity repulsive force between generated carboxyl anions. As the basic compound, ammonia and an organic amine compound of which the boiling point is 250° C. or lower are included. As an example of the desirable organic amine compound, triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, morpholine, N-methylmorpholine, and N-ethylmorpholine may be included. According to the carboxyl group included in the polyester resin, the basic compound may be added in the amount with which at least partial neutralization may be performed, that is, preferably in the range of 0.2 times equivalent to 9.0 times equivalent based on the carboxyl group, and more preferably in the range of 0.6 times equivalent to 2.0 times equivalent. If the amount is 0.2 times equivalent or greater, the effect of adding the basic compound is admitted. If the amount is 9.0 times equivalent or less, the distribution of the particle diameter is hardly expanded, which is considered to be a result that the hydrophilicity of the oil phase is prevented from being excessive, and satisfactory dispersion may be obtained.

Coloring Pigment Disposing Step

In the coloring pigment disposing step, the coloring pigment and the inorganic oxide particles which are used if necessary are provided on the surface of the powder particles prepared in the powder particle preparing step.

The method of disposing the coloring pigments or the like on the surface of the powder particles is not particularly limited. For example, the coloring pigment and the inorganic oxide particles used if necessary are added and mixed to powder particles, and the coloring pigment and the inorganic oxide particles used if necessary are provided on the surface of the powder particles. The mixing may be performed by a well-known mixer such as a V-type blender, Henschel mixer, and Löedige mixer.

When the coloring pigment and the inorganic oxide particles used if necessary are provided on the surface of the powder particles by using the mixer described above, the coloring pigment and the inorganic oxide particles may be added at the same time, or may be separately added.

EXAMPLES

Hereinafter, the embodiment is described in detail with reference to the examples, but the embodiment is not limited to the examples.

Method of Preparing a Sample of a Coated Film Formed of a Powder Coating Material The powder coating material is applied at a distance of 30 cm from the front surface of a 10 cm×10 cm square test panel of the zinc phosphate treated steel panel by a Corona gun manufactured by Asahi Sunac Corporation so that the thickness of the coated film becomes in the range of 30 μm to 50 μm. The baking temperature is in the range of 90° C. to 250° C., preferably in the range of 100° C. to 220° C., and more preferably in the range of 120° C. to 200° C. The baking time is adjusted according to the baking temperature, but in this example, a period of 30 minutes at 180° C. is selected.

Measurement of Charge Amount of Attached Powder Coating Material

The charge amount of the powder in the center portion of the coated square test panel is measured by using EA02 manufactured by UING Corporation. The amount of the sucked powder is measured and the charge amount (μC/g) per unit weight is calculated.

Evaluation of Attachment Efficiency of Powder

The powder coating material is applied for 2 seconds at a distance of 30 cm from the front surface of a 30 cm×30 cm square test panel of the zinc phosphate treated steel panel by a Corona gun manufactured by Asahi Sunac Corporation, and the attachment efficiency of powder is calculated with a weight difference A before and after the powder attached to the panel is removed and a weight B of the powder which is not attached and is collected.

$$A/(A+B)\times100(\%)$$

Evaluation of Surface Smoothness of Coated Film of Powder Coating Material

Central line average roughness (hereinafter, denoted by as "Ra". Unit: μm) is measured by using a surface roughness measuring device (SURFCOM 1400A manufactured by Tokyo Seimitsu Co., Ltd.). As the size of Ra is greater, the surface smoothness is low.

Color or Feeling of Coated Film

Grade 1: Mottled appearance is not visually seen at a distance of 20 cm from the coated film Grade 2: Mottled appearance is visually seen slightly at a distance of 20 cm from the coated film but mottled appearance is not visually seen at a distance of 50 cm Grade 3: Mottled appearance is visually seen at a distance of 50 cm from the coated film Preparation of White Powder Particle (PCW1)

Preparation of White Pigment Dispersion (W1)

Titanium oxide (A-220 manufactured by Ishihara Sangyo Kaisha, Ltd.): 100 parts by weight Anionic surfactant (Neogen RK manufactured by DKS Co. Ltd.): 15 parts by weight Ion exchanged water: 400 parts by weight The above are mixed, dispersed for 3 hours by using a high pressure impact-type disperser ultimizer (HJP30006 manufactured by Sugino Machine Limited), and thus the white pigment dispersion is prepared in which titanium oxide is dispersed. Measurement is performed by using a laser diffraction particle size measuring instrument, the average particle diameter of the titanium oxide pigment in the pigment dispersion is 0.25 μm, and the solid content ratio of the pigment dispersion is 25% by weight.

Preparation of Polyester Resin (PES1)

Raw materials with the composition below are put into a reaction vessel including a stirrer, a thermometer, a nitrogen gas inlet, and a rectifier, tin dioctanoate is used as a catalyst, the temperature is heated to 230° C. while stirring is performed under a nitrogen atmosphere, and the polycondensation reaction is performed.

Terephthalic acid: 50% by mol
Isophthalic acid: 50% by mol
Ethylene glycol: 60% by mol
Neopentyl glycol: 40% by mol The glass transition temperature of PES1 which is a polymer is 57° C., the acid value (Av) is 12 mgKOH/g, the hydroxyl value (OHv) is 55 mgKOH/g, the weight average molecular weight (Mw) is 10,000, and the number average molecular weight (Mn) is 4,000.

Preparation of Polyester Resin-Curing Agent Composite Dispersion (E1)

While the temperature of a jacketed 3-liter reaction vessel including a condenser, a thermometer, a water dropping device, and anchor blades (BJ-30N manufactured by Tokyo Rikakikai Co., Ltd.) is maintained at 40° C. in a circulating constant-temperature water bath, a mixed solvent of 180 parts by weight of ethyl, acetate and 80 parts by weight of isopropyl alcohol is put into the reaction vessel, and the following compositions are put thereinto.

Polyester resin (PES1): 240 parts by weight
Blocked isocyanate curing agent VESTAGONB1530 (manufactured by Evonik Industries AG): 60 parts by weight
Benzoin: 1.5 parts by weight
Acryl oligomer (Acronal 4F manufactured by BASF SE): 3 parts by weight After the components are put into the vessel, stirring is performed at 150 rpm by using a three-one motor, the compositions are dissolved and the oil phase is obtained. Into the stirred oil phase, mixture liquid of 1 part by weight of aqueous solution of 10% by weight of ammonia and 47 parts by weight of aqueous solution of 5% by weight of sodium hydroxide is dropped for 5 minutes and is mixed for 10 minutes, 900 parts by weight of ion exchanged water are dropped at a speed of 5 parts by weight per minute, phase inversion is performed, and emulsion is obtained. 800 parts by weight of obtained emulsion and 700 parts by weight of the ion exchanged water are immediately put into a 2-liter eggplant-shaped flask, and the eggplant-shaped flask is set in an evaporator (manufactured by Tokyo Rikakikai Co., Ltd.) including a vacuum control unit via a trap ball. While rotating the eggplant-shaped flask, heating is performed by a 60° C. hot water bath, and pressure is reduced to 7 kPa while paying attention to bumping, and the solvent is removed. When the solvent collection amount is 1,100 parts by weight, the pressure is returned to normal pressure, the eggplant-shaped flask is water-cooled, and the dispersion is obtained. There is no smell of the solvent in the obtained dispersion. The volume average particle diameter of the resin particles in the dispersion is 135 nm. Thereafter, 2% by weight of the anionic surfactant (Dowfax2A1 manufactured by The Dow Chemical Company, amount of active ingredient: 45% by weight) is added and mixed as an active ingredient to the resin particle in the dispersion, the ion exchanged water is added, and the solid component concentration is adjusted to be 20% by weight. This is a polyester resin-curing agent composite dispersion (E1).

Aggregating Step

Polyester resin-curing agent composite dispersion (E1): 240 parts by weight (48 parts by weight of solid content)

White pigment dispersion (W1): 160 parts by weight (40 parts by weight of solid content)

Ion exchanged water: 200 parts by weight

The above are mixed and dispersed by a homogenizer (ULTRA-TURRAX T50 manufactured by IKA) in a round stainless steel flask. Subsequently, pH is adjusted to 3.5 by using aqueous solution of 1.0% by weight of nitric acid. 0.50 parts of aqueous solution of 10% by weight of aluminum polychloride are added to this, and a dispersion operation is continued by ULTRA-TURRAX.

A stirrer and a mantle heater are installed, the number of rotation of the stirrer is adjusted so that the slurry is sufficiently stirred, the temperature is increased to 50° C., the temperature is maintained at 50° C. for 15 minutes, subsequently, a particle diameter is measured by Coulter Multisizer II type (aperture diameter: 50 μm manufactured by Beckman Coulter, Inc.), and 60 parts by weight of the polyester resin-curing agent composite dispersion (E1) are slowly put thereinto when the volume average particle diameter becomes 5.5 μm.

Coalescence Step

After the components are put thereinto and maintained for 30 minutes, aqueous solution of 5% by weight of sodium hydroxide is used to adjust pH to be 7.0. Thereafter, the temperature is increased to 85° C., and the resultant is maintained for 2 hours.

Filtering, Washing, and Drying Step

After the reaction is completed, the solution in the flask is cooled and filtered to obtain a solid content. Subsequently, the solid content is washed with ion exchanged water, liquid-solid separation is performed by Nutsche-type suction filtration, and the solid content is obtained again.

Subsequently, the solid content is redispersed in 3 liters of ion exchanged water at 40° C., is stirred for 15 minutes at 300 rpm, and is washed. The washing operation is repeated for 5 times, the solid content obtained by performing the liquid-solid separation by Nutsche-type suction filtration is vacuum-dried for 12 hours to obtain white powder particles (PCW1).

When the particle diameter of the white powder particles is measured, the volume average particle diameter D50v is 6.2 μm, and the volume average particle size distribution index GSDv is 1.24. The average circularity measured by using a flow-type particle image analyzer "FPIA-1000"

manufactured by Sysmex Corporation is 0.98, and thus the particles are substantially spherical.

Preparation of White Powder Particles (PCW2)

White powder particles (PCW2) are obtained in the same manner as that described above except that when the aggregation particle diameter in the aggregating step of the white powder particles (PCW1) is 3.1 μm, the polyester resin-curing agent composite dispersion (E1) is added, the temperature is increased to 85° C. in the coalescence step, and the resultant is maintained for 3 hours. The volume average particle diameter D50v of the white powder particle is 3.7 μm, and the volume average particle size distribution index GSDv is 1.27. The average circularity is 0.99, and thus the particle is substantially spherical.

Preparation of White Powder Particles (PCW3)

White powder particles (PCW3) are obtained in the same manner as that described above except that when the aggregation particle diameter in the aggregating step of the white powder particles (PCW1) is 6.8 μm, the polyester resin curing agent composite dispersion (E1) is added, the temperature is increased to 85° C. in the coalescence step, and the resultant is maintained for 2 hours. The volume average particle diameter D50v of the white powder particles is 7.8 μm, the volume average particle size distribution index GSDv is 1.23. The average circularity is 0.97 and thus the particle is substantially spherical.

Preparation of White Powder Particles (PCW4)

White powder particles (PCW4) are obtained in the same manner as that described above except that when the aggregation particle diameter in the aggregating step of the white powder particles (PCW1) is 9.5 μm, the polyester resin curing agent composite dispersion (E1) is added, the temperature is increased to 85° C. in the coalescence step, and the resultant is maintained for 2 hours. The volume average particle diameter D50v of the white powder particles is 10.8 μm, the volume average particle size distribution index GSDv is 1.23. The average circularity is 0.96.

Preparation of Colored Powder Coating Material (PC1)
White powder coating material (PCW1): 97 parts by weight
Cyan pigment (C. I. Pigment Blue 15:3 (copper phthalocyanine) manufactured by Dainichiseika Color & Chemicals Mfg. Co., Ltd.,): 2 parts by weight
Inorganic oxide particles (hydrophobic silica R812, particle diameter of 7 nm, manufactured by Nippon Aerosil Co.): 1.2 parts by weight These are mixed by using a Henschel mixer, at a circumferential speed of 32 m/s for 10 minutes, a sieve having a 45 μm mesh is used to remove coarse particles, and a colored powder coating material (PC1) is obtained.

Preparation of a Colored Powder Coating Material (PC2)

A colored powder coating material (PC2) is obtained in the same manner as that described above except that the cyan pigment used in the preparation of a colored powder coating material (PC1) is changed to a magenta pigment P122.

Preparation of Colored Powder Coating Materials (PC3 to PC8)

Colored powder coating materials (PC3 to PC3) are obtained in the same manner as that described above except that the coloring pigment and the inorganic oxide particles used in the preparation of a colored powder coating material (PC1) are changed as presented in Table 1. In addition, R972 in Table 1 means silica particles (average primary particle diameter: 16 nm) manufactured by Nippon Aerosil Co.

Preparation of Colored Powder Coating Material (PC9)
Polyester resin (PES1): 50 parts by weight
Blocked isocyanate curing agent VESTAGONB1530 (manufactured by EVONIK): 10 parts by weight
Titanium oxide (A-220 manufactured by Ishihara Sangyo Kaisha, Ltd.): 40 parts by weight The ingredients above are kneaded by a Banbury mixer, and minutely pulverized by using a jet mill, and the white powder particles (PCW5) of which the volume average particle diameter D50v is 8.0 μm, and the volume average particle size distribution index GSDv is 1.48 are obtained. The average circularity is 0.94.

97 parts by weight of the powder are put into a mixer, and are treated for 3 minutes at 80 m/sec of the circumferential speed of stirring and mixing blades, 2 parts by weight of a cyan pigment (C. I. Pigment Blue 15:3 (copper phthalocyanine) manufactured by Dainichiseika Color & Chemicals Mfg. Co., Ltd.) and 1.0 part by weight of hydrophobic silica R812 (particle diameter 7 nm, manufactured by Nippon Aerosil Co.) are put thereinto, and treated for 1 minute at 40 m/sec of the circumferential speed of stirring and mixing blades, and coarse particles are removed by a 150 mesh, and a colored powder coating material (PC9) is obtained.

TABLE 1

| Sample ID | White powder particles | Coloring pigment Type | Quantity (% by weight) | Inorganic oxide particles Type | Quantity (% by weight) | Performance of coating material Volume Average Particle Diameter (μm) | GSDv | Average circularity |
|---|---|---|---|---|---|---|---|---|
| PC1 | PCW1 | Cyan | 2 | R812 | 1.2 | 6.2 | 1.24 | 0.98 |
| PC2 | PCW1 | Magenta | 2 | R812 | 1.2 | 6.2 | 1.24 | 0.98 |
| PC3 | PCW2 | Cyan | 3 | R812 | 1.5 | 3.7 | 1.27 | 0.99 |
| PC4 | PCW2 | Magenta | 3 | R812 | 1.4 | 3.7 | 1.27 | 0.99 |
| PC5 | PCW3 | Cyan | 2.5 | R972 | 0.8 | 7.8 | 1.23 | 0.97 |
| PC6 | PCW3 | Magenta | 2 | R972 | 0.8 | 7.8 | 1.23 | 0.97 |
| PC7 | PCW4 | Cyan | 2 | R972 | 0.8 | 10.8 | 1.23 | 0.96 |
| PC8 | PCW4 | Magenta | 2 | R972 | 0.8 | 10.8 | 1.23 | 0.96 |
| PC9 | PCW5 | Cyan | 2 | P812 | 1.0 | 8.0 | 1.48 | 0.94 |

TABLE 2

|  | Sample Configuration | | | Charge | | Surface Roughness | Mottled appearance |
| --- | --- | --- | --- | --- | --- | --- | --- |
|  | Sample 1 | Sample 2 | 1/2 (Ratio by weight) | amount (μC/g) | Attachment Efficiency | Ra of coated film | of color of coated film |
| Example 1 | PC1 | — | — | −8.5 | 84 | 0.06 |  |
| Example 2 | PC2 | — | — | −8.3 | 89 | 0.06 |  |
| Example 3 | PC1 | PC2 | 1 | −8.5 | 85 | 0.05 | Grade 1 |
| Example 4 | PC3 | PC4 | 0.33 | −12.1 | 82 | 0.05 | Grade 1 |
| Example 5 | PC5 | PC6 | 2 | −6.3 | 88 | 0.07 | Grade 2 |
| Comparative Example 1 | PC7 | — | — | −5.6 | 57 | 0.12 |  |
| Comparative Example 2 | PC8 | — | — | −6.2 | 49 | 0.11 |  |
| Comparative Example 3 | PC7 | PC8 | 1 | −5.8 | 53 | 0.12 | Grade 3 |
| Comparative Example 4 | PC9 | — | — | −3.8 | 43 | 0.20 |  |

From Table 2, the following is found.

In a sample of which the average circularity is great and which is spherical, attachment efficiency is high, and the smoothness is also high. Even if samples in other colors are mixed, the satisfactory coated film of which mottled appearance is not shown may be obtained. The reason therefor is that because the powder particles are spherical, the coloring pigment and the inorganic oxide particles on the surface of the particles are accurately attached, and thus the charge properties are highly uniform.

Meanwhile, in a sample of which the particle diameter is great, and the average circularity is small, the attachment efficiency is low, and the mottled appearance is shown. It is considered that the reason therefor is that the mottled appearance becomes worse due to the great particle diameter, and that since the particle is not spherical, and thus the uniformity of the charge is bad due to the attachment unevenness of the coloring pigment, resulting in not only bad attachment efficiency but also disordered attachment uniformity.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A powder coating material comprising:
   powder particles that include a binder resin, have an average circularity of 0.98 or greater, and have a coloring pigment provided on a surface of the powder particles,
   wherein the binder resin contains a polyester resin,
   wherein the volume average particle diameter of the powder particles is 3 μm to 7.8 μm,
   wherein inorganic oxide particles exist on the surfaces of the powder particles,
   wherein an addition ratio of the inorganic oxide particles to the powder particles is in a range of 0.1% by weight to 1.5% by weight, and
   wherein the concentration of coloring pigment in the powder coating is from 2% to 3% by weight with respect to the powder coating.
2. The powder coating material according to claim 1, wherein a volume average particle size distribution index GSDv of the powder particles is 1.40 or lower.
3. The powder coating material according to claim 1, wherein the powder particles contain a white pigment.
4. The powder coating material according to claim 3, wherein the white pigment is at least one selected from the group consisting of titanium oxide, barium sulphate, zinc oxide, and calcium carbonate.
5. The powder coating material according to claim 3, wherein a content of the white pigment is in a range of 10% by weight to 50% by weight.
6. The powder coating material according to claim 1, wherein the inorganic oxide particles are at least one selected from the group consisting of silica, alumina, titania, and calcium carbonate.
7. The powder coating material according to claim 1, wherein a volume average particle diameter of the inorganic oxide particles is in a range of 5 nm to 200 nm.
8. The powder coating material according to claim 1, wherein a sum of an acid value and a hydroxyl value of the polyester resin is in the range of 10 mgKOH/g to 250 mgKOH/g.
9. The powder coating material according to claim 8, wherein a number average molecular weight of the polyester resin is in the range of 1,000 to 100,000.
10. The powder coating material according to claim 8, wherein a content of the polyester resin is in the range of 20% by weight to 99% by weight with respect to a total of the powder particles.
11. The powder coating material according to claim 1, wherein the powder particles contain a curing agent.
12. The powder coating material according to claim 11, wherein a content of the curing agent is in the range of 1% by weight to 40% by weight with respect to the binder resin.
13. The powder coating material according to claim 1, wherein a content of the coloring pigment is in the range of 1 part by weight to 70 parts by weight with respect to 100 parts by weight of the binder resin.
14. The powder coating material according to claim 1, wherein the powder particles have a core-shell structure.

* * * * *